United States Patent
Abramson et al.

(10) Patent No.: US 12,436,250 B2
(45) Date of Patent: Oct. 7, 2025

(54) NAVIGATION SYSTEMS AND METHODS FOR AN AUTONOMOUS DEVICE

(71) Applicant: MTD PRODUCTS INC, Valley City, OH (US)

(72) Inventors: Shai Abramson, Pardesiya (IL); Christopher J. Churavy, Lakewood, OH (US); Ido Ikar, Tel Mond (IL); Ayala Raanan, Raanana (IL)

(73) Assignee: MTD PRODUCTS INC, Valley City, OH (US)

( * ) Notice: Subject to any disclaimer, the term of this patent is extended or adjusted under 35 U.S.C. 154(b) by 444 days.

(21) Appl. No.: 17/871,333

(22) Filed: Jul. 22, 2022

(65) Prior Publication Data
US 2023/0021697 A1   Jan. 26, 2023

Related U.S. Application Data

(60) Provisional application No. 63/225,051, filed on Jul. 23, 2021.

(51) Int. Cl.
*G01S 11/06* (2006.01)
*G05D 1/00* (2024.01)
(Continued)

(52) U.S. Cl.
CPC .............. *G01S 11/06* (2013.01); *G05D 1/00* (2013.01); *G05D 1/0088* (2013.01);
(Continued)

(58) Field of Classification Search
CPC .......... G01S 11/06; G01S 5/14; G01S 5/0269; G01S 7/006; G01S 13/12; G08B 21/0269;
(Continued)

(56) References Cited

U.S. PATENT DOCUMENTS

| 6,198,919 B1 * | 3/2001 | Buytaert | G07B 15/063 |
| | | | 455/426.1 |
| 9,568,588 B2 * | 2/2017 | Jones | G01S 5/14 |

(Continued)

FOREIGN PATENT DOCUMENTS

| EP | 2706371 A2 | 12/2014 |
| WO | 2015127954 A1 | 9/2015 |
| WO | 2021060678 A1 | 4/2021 |

OTHER PUBLICATIONS

International Search Report and Written Opinion for International Application No. PCT/US2022/038018 dated Nov. 14, 2022, 13 pages.

(Continued)

*Primary Examiner* — Yuri Kan
(74) *Attorney, Agent, or Firm* — Wegman Hessler Valore (57) ABSTRACT

A system and method for proximity determination can include receiving an RF signal transmitted from a target location, the receiving performed by an antenna of an autonomous moving device, extracting received signal strength indicator (RSSI) values by processing the received RF signal, receiving distance measurements provided by a sensor associated with the autonomous moving device and storing the distance measurements in the memory of the autonomous device. The extracted RSSI values can be correlated the with the distance measurements to obtain a proximity value. A distance to the target location can be determined based on the proximity values.

25 Claims, 7 Drawing Sheets

(51) Int. Cl.
    *H04B 17/318*     (2015.01)
    *H04W 4/02*     (2018.01)
    *H04W 4/80*     (2018.01)

(52) U.S. Cl.
    CPC .......... *H04B 17/318* (2015.01); *H04W 4/025* (2013.01); *H04W 4/80* (2018.02)

(58) Field of Classification Search
    CPC ....... G10L 25/60; G16H 40/20; H04W 4/023; H04W 64/00; B60L 15/20; G07B 15/063; H04N 7/152; H04L 65/1083; G08G 1/168; G01R 31/11; H04M 1/6016
    See application file for complete search history.

(56) References Cited

U.S. PATENT DOCUMENTS

| | | | | |
|---|---|---|---|---|
| 10,631,165 | B1 * | 4/2020 | Goyal | H04W 4/023 |
| 2002/0086656 | A1 * | 7/2002 | Mattisson | H04M 1/6016 |
| | | | | 455/352 |
| 2002/0158791 | A1 * | 10/2002 | Meier | G01S 13/12 |
| | | | | 340/901 |
| 2013/0211704 | A1 * | 8/2013 | Thompson | B60L 15/20 |
| | | | | 701/300 |
| 2014/0170979 | A1 * | 6/2014 | Samanta Singhar | G10L 25/60 |
| | | | | 455/41.2 |
| 2015/0215793 | A1 * | 7/2015 | Siomina | H04W 64/00 |
| | | | | 455/456.1 |
| 2015/0302716 | A1 * | 10/2015 | Portalise | G08B 21/0269 |
| | | | | 340/539.13 |
| 2017/0199235 | A1 * | 7/2017 | Jeon | G01R 31/11 |
| 2018/0082588 | A1 * | 3/2018 | Hoffman, Jr. | G08G 1/168 |
| 2021/0063556 | A1 * | 3/2021 | Usaj | G01S 11/06 |
| 2021/0352242 | A1 * | 11/2021 | McArdle | H04L 65/1083 |
| 2022/0246304 | A1 * | 8/2022 | Shyu | G16H 40/20 |
| 2023/0156152 | A1 * | 5/2023 | McArdle | H04N 7/152 |
| | | | | 348/14.09 |
| 2023/0273291 | A1 * | 8/2023 | Ozturk | G01S 7/006 |
| | | | | 342/52 |
| 2023/0296722 | A1 * | 9/2023 | Shrestha | G01S 5/0269 |
| | | | | 455/456.1 |

OTHER PUBLICATIONS

Anshul Rai et al.: "Zee: Zero-Effort Crowdsourcing for Indoor Localization", Mobile Computing and Networking, ACM, 2 Penn Plaza, Suite 701 New York NY 10121-071 USA, Aug. 22, 2012, pp. 293-304.

* cited by examiner

FIG. 1

PROXIMITY TABLE 200

| RSSI Value | Distance |
|---|---|
| -10 dBm | 15cm |
| -15 dBm | 20cm |
| -17 dBm | 28cm |
| -25 dBm | 39cm |
| -31 dBm | 55cm |
| -38 dBm | 67cm |
| -45 dBm | 75cm |
| -52 dBm | 100cm |
| -61 dBm | 175cm |
| -75 dBm | 200cm |
| -80 dBm | 350cm |

NAVIGATION SYSTEMS AND METHODS FOR AN AUTONOMOUS DEVICE

CROSS REFERENCE TO RELATED APPLICATIONS

This application claims the benefit of U.S. Provisional Application No. 63/225,051, filed Jul. 23, 2021, the entire disclosure of which is incorporated herein by reference.

FIELD OF THE INVENTION

The disclosed systems and methods are directed to autonomous device navigation systems and methods, and more particularly, systems and methods for proximity detection and proximity determination, and for directing movement of the autonomous device.

BACKGROUND OF THE INVENTION

Many conventional autonomous device navigation systems and methods, or systems and methods for confining an autonomous device to a work area, involve movement and operation of the autonomous device such as determining a location of the autonomous device in relation to a boundary wire. While such confinement systems are known to work well when utilized in the performance of routine work operations, knowledge of the proximity or orientation of the autonomous device relative to a target location is useful in many circumstances. Some attempted solutions have utilized cameras or other vision based systems, or additional wire loops, but this has not sufficiently addressed the needs of the industry owing to its cost and complexity.

BRIEF SUMMARY OF THE INVENTION

The following presents a simplified summary in order to provide a basic understanding of some aspects of the disclosure. This summary is not an extensive overview of the disclosure. It is not intended to identify key/critical elements or to delineate the scope of the disclosure. Its sole purpose is to present some concepts of the disclosure in a simplified form as a prelude to the more detailed description that is presented later.

To accomplish the foregoing and related ends, certain illustrative aspects of the disclosure are described herein in connection with the following description and the drawings. These aspects are indicative, however, of but a few of the various ways in which the principles of the disclosure can be employed and the subject disclosure is intended to include all such aspects and their equivalents. Other advantages and features of the disclosure will become apparent from the following detailed description of the disclosure when considered in conjunction with the drawings.

In an embodiment, a method for autonomous device navigation includes receiving an RF signal transmitted from a target location, the receiving performed by an antenna of an autonomous device, extracting a received signal strength indicator (RSSI) value by processing the received RF signal, evaluating the RSSI value based on a location proximity value stored in a memory of the autonomous device, moving the autonomous device towards a target location when the RSSI value is greater than or equal to the location proximity value, receiving a distance measurement when the autonomous device has reached the target location, and calibrating the location proximity value based on the distance measurement.

The location proximity value can include a calculated RSSI value which corresponds to a prescribed distance. The distance measurement can include a distance traveled by the autonomous device from a point where the RSSI value was determined to be greater than or equal to the location proximity value and the target location. Calibrating the location proximity value based on the distance measurement can include increasing or decreasing the location proximity value stored in memory.

An indication that the autonomous device has reached the target location can include at least one of data from an obstacle detection sensor and data from a charging contact of the autonomous device. Processing the received RF signal, evaluating the RSSI value, and calibrating the location proximity can be performed by a processing component of the autonomous device. The distance measurement can be based on navigational sensor data comprising a distance traveled by the autonomous device, the navigational sensor data comprises odometry data.

The RF signal can be a Bluetooth Low Energy (BLE) beacon transmission. The autonomous device can be an autonomous mower. The method for proximity determination can include moving the autonomous device towards the target location, and performing a docking maneuver when the RSSI value is greater than or equal to the location proximity value. Calibrating the location proximity value can include a direct correlation, an algorithmic correlation, and or a weighted correlation.

The location proximity value can be calibrated prior to performance of a work operation by the autonomous device, at a conclusion of a performance of an operation of the autonomous device, at a random time interval, in response to a user command, and/or at the detection of an environmental change. The location proximity value can be calibrated in response to a change in an operating environment of the autonomous device, wherein the change comprises at least one of data provided a moisture sensor, rain gage or obstacle detection sensor.

In an embodiment, a method for proximity determination can include receiving an RF signal transmitted from a target location, the receiving performed by an antenna of an autonomous moving device, extracting received signal strength indicator (RSSI) values by processing the received RF signal, wherein the autonomous device comprises a memory in which extracted RSSI values are stored, receiving distance measurements provided by a sensor associated with the autonomous moving device and storing the distance measurements in the memory of the autonomous device, and correlating the extracted RSSI values with the distance measurements to obtain a proximity value.

The proximity value can include a correlation of an RSSI value and a distance value. Correlating the extracted RSSI values with the distance measurements can include receiving distance measurements while the autonomous device is in motion, comparing the distance measurements to the extracted values until an indication that autonomous device has reached the target location, and modifying the proximity values.

A method for proximity determination can include determining a proximity of the autonomous moving device in relation to the target location based the proximity value, wherein the proximity value comprises an RSSI value and a corresponding distance value. The proximity value can include an estimated distance to the target location.

The indication that the autonomous device has reached the target location can include at least one of data from an obstacle detection sensor and data from a charging contact of the autonomous device. Processing the received RF signal, correlating the extracted RSSI values with the distance measurements, and determining the proximity of the autonomous moving device can be performed by a processing component of the autonomous device. The distance measurements can be based on navigational sensor data comprising a distance traveled by the autonomous device, wherein the navigational sensor data comprises odometry data.

A method for proximity determination can include moving the autonomous device to the target location based on the extracted RSSI values, and performing a docking maneuver at a predetermined distance from the target location based on the proximity values.

Correlating the RSSI with the measured distance to obtain the proximity value can include any of a direct correlation, an algorithmic correlation and/or a weighted correlation. The proximity value can be updated at a pre-determined time interval, wherein the predetermined time interval is one of 6 hours, 12 hours, 24 hours, and 36 hours. The proximity value can be updated prior to performance of a work operation by the autonomous device, at a conclusion of a performance of an operation of the autonomous device, at a random time interval, in response to a user command, and/or at the detection of an environmental change.

A method for autonomous device navigation can include receiving an RF signal transmitted from a target location, the receiving performed by an antenna of the autonomous device, extracting received signal strength indicator (RSSI) values by processing the received RF signal, and moving the autonomous device to the target location based on the extracted RSSI values, wherein the autonomous device comprises a memory in which extracted RSSI values are stored, and wherein the moving of the autonomous device to dock to the base station based on the extracted RSSI values can include evaluating RSSI values as the autonomous device is in motion, and determining an RSSI gradient based on successive RSSI values and a distance traveled, moving the autonomous device forward when a successive RSSI gradient is greater than or equal to a previous RSSI gradient, and executing a left turn when a successive RSSI gradient is less than a previous RSSI gradient.

A method for autonomous device navigation or proximity determination can include evaluating RSSI values as the autonomous device is in motion, and moving the autonomous device forward when a successive RSSI value is greater than or equal to a previous RSSI value, performing a docking maneuver when the RSSI value is greater than or equal to a predetermined turning point threshold value, correlating a turning point threshold value with a distance to the base station based on odometry sensor data indicating a distance traveled by the autonomous device, and adjusting, via the processor, the predetermined turning point threshold value to correspond to a distance X. The predetermined turning point threshold value can be varied at each operation.

In an embodiment, a system or apparatus for autonomous device navigation and proximity determination includes a memory device that stores a set of instructions, and a processor that executes the set of instructions for receiving an RF signal transmitted from a target location, the receiving performed by an antenna of an autonomous moving device, extracting received signal strength indicator (RSSI) values by processing the received RF signal, wherein the autonomous device comprises a memory device in which extracted RSSI values are stored, receiving distance measurements provided by a sensor associated with the autonomous moving device and storing the distance measurements in the memory of the autonomous device, and determining a proximity value by correlating the extracted RSSI values with the distance measurements. The proximity values are stored in the memory device in a data structure or table. The proximity values can be calibrated as the autonomous device moves towards the target location, and the proximity values can be calibrated when the autonomous device has reached the target location.

In an embodiment, a proximity determination apparatus that receives a radio frequency (RF) signal transmitted from a target location and extracts received signal strength indicator (RSSI) values by processing the received RF signal includes a memory device that stores a set of instructions, and a processor that executes the set of instructions for receiving distance measurements provided by a sensor associated with an autonomous moving device, storing the distance measurements in the memory of the autonomous device, correlating the extracted RSSI values with the distance measurements to obtain a proximity value, and storing the proximity value in the memory of the autonomous device.

In an embodiment, a method for calibrating a proximity detection data structure includes receiving an RF signal transmitted from a target location, the receiving performed by an antenna of an autonomous moving device, extracting received signal strength indicator (RSSI) values by processing the received RF signal, wherein the autonomous device comprises a memory in which extracted RSSI values are stored, receiving distance measurements provided by a sensor associated with the autonomous moving device and storing the distance measurements in the memory of the autonomous device, correlating the extracted RSSI values with the distance measurements to obtain a proximity value and storing the proximity value in the proximity detection data structure in the memory of the autonomous device.

A method for calibrating a proximity detection data structure can include providing a data structure comprising default proximity values, and updating the default proximity values based on the correlation of the extracted RSSI values and the distance measurements.

It should be noted that all the drawings are diagrammatic and not drawn to scale. Relative dimensions and proportions of parts of the figures have been shown exaggerated or reduced in size for the sake of clarity and convenience in the drawings. The same reference numbers are generally used to refer to corresponding or similar features in the different embodiments. Accordingly, the drawings and description are to be regarded as illustrative in nature and not as restrictive.

DETAILED DESCRIPTION

The following terms are used throughout the description, the definitions of which are provided herein to assist in understanding various aspects of the subject disclosure.

As used herein, the term "autonomous device" refers to an autonomous mower, autonomous robot, or most any autonomous device or machine that performs various tasks and functions including lawn mowing, lawn maintenance, vacuum cleaning, floor sweeping, and the like.

As used herein, the term "navigation" refers to directing movement of an autonomous device, ascertaining a position of an autonomous device, planning, and following a route, determining a location and/or proximity of a robotic mower in relation to a work area or landmark (e.g., docking station, charging station, beacon, or obstacle), proximity detection, proximity determination, confinement, or confining an autonomous device to a work area, boundary sensing, and/or localization.

As used herein, the term "wire" refers to a wire loop, perimeter wire, perimeter wire loop, conductor, boundary wire, boundary conductor, or other boundary marker for defining a work area. The term "wire" can also refer to multiple wires for defining, for example, multiple work areas, or zones within a work area. The term "wire" can also refer to multiple physically and electrically separate wires for defining, for example, multiple work areas, or zones within a work area.

In the following description, for purposes of explanation, numerous specific details are set forth in order to provide a thorough understanding of the subject disclosure. It may be evident, however, that the disclosure can be practiced without these specific details. In other instances, well-known structures and devices are shown in block diagram form in order to facilitate describing the disclosure.

Figure 1:
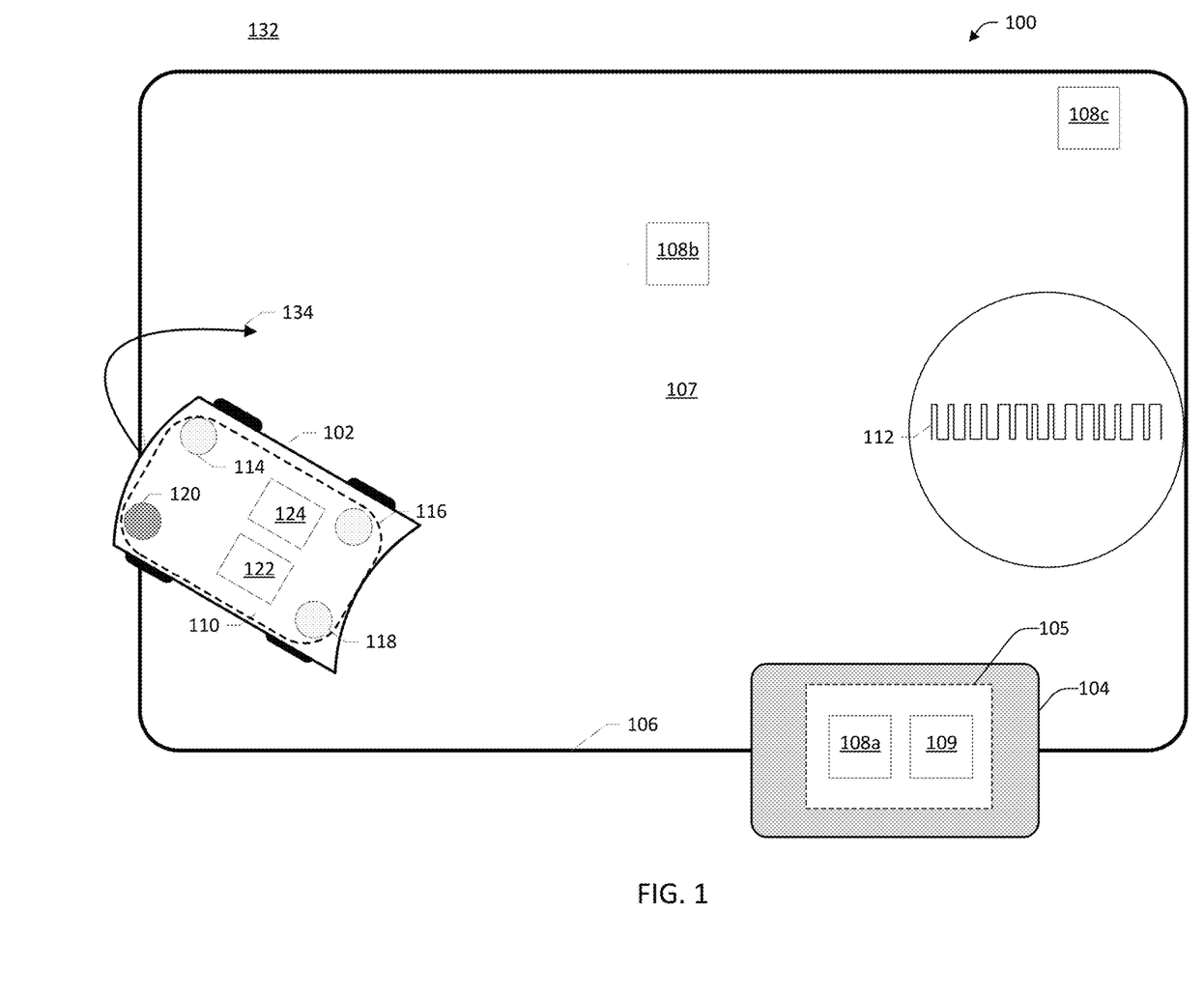
FIG. 1 is a block diagram of an example system for proximity detection in accordance with one or more embodiments of the disclosed technology.

As illustrated in FIG. 1, a system for autonomous device navigation 100 can include an autonomous device 102 having a receiver 110 including a processing component 122 and navigational sensors 124. The system can include a base station 104, a transmitter 105, one or more beacons 108*a*, 108*b* and 108*c*, and a wire 106 defining a work area 107. The transmitter 105 is in electrical communication with the wire 106 and can be configured to generate and transmit a periodic signal 112 via the wire 106. The signal 112 is an electromagnetic signal generated by transmitter 105, which travels along the wire 106 inducing a magnetic field that propagates through the air.

In an embodiment, the base station 104 comprises a charging station or docking station. The base station 104 includes the transmitter 105, the beacon 108*a*, and a processing module 109, which can be co-located with the base station 104. For example, the transmitter 105 can include a beacon 108*a*, and a processing module 109. In other embodiments, the processing module 109 is in operable communication with the transmitter 105 and other components of the base station 104, for example connected wirelessly, and is located remotely. Likewise, the beacon 108*a* can be co-located with any of the base station 104, transmitter 105, and/or processing module 109. Alternatively, and as shown, one or more beacons 108*b*, 108*c* can be located within the work area 107 and physically separated from any of the base station 104, transmitter 105, and/or processing module 109.

In an embodiment, the beacon 108*a*, 108*b*, 108*c* includes a Bluetooth® Low Energy (BLE) wireless transmitter that can transmit self-contained packets of data to other nearby devices at set intervals. The beacon 108*a* transmits a radio wave such as a data packet including a Universally Unique Identifier (UUID), which identifies the beacon 108*a*, through communication using BLE at predetermined time intervals.

In an embodiment, the processing module 109 associated with the base station 104 includes a microprocessor, controller, memory, current sensing circuitry, signal generator, and other associated hardware, software, and algorithms for generating and transmitting a signal 112 over the wire 106. The processing module 109 can receive input data provided by sensing circuitry, and other sensors and inputs.

The transmitter 105 is operatively coupled to a wire 106 defining a work area 107. The transmitter 105 generates and transmits a signal 112 that travels along the wire 106 inducing magnetic fields. The magnetic fields propagate or otherwise travel wirelessly through the air and are received by the autonomous device 102. The transmitter 105 produces signals for use by the autonomous device 102 for multiple functions, in particular, to determine the location of the autonomous device 102 relative to the work area 107 defined by wire 106, and to direct movement of the autonomous device 102.

The work area 107 is defined by a boundary, for example, wire 106 arranged around the perimeter of the work area 107. The work area 107 is the area within which the autonomous device 102 is intended to operate, for example, a grass covered area of a yard, garden, field, or park. The wire 106 separates the work area 107, lying within the perimeter defined by the wire 106, from a non-work area 132, which lies outside of the perimeter defined by the wire 106. The autonomous device 102 is intended to move in relation to the wire 106, and to remain substantially within the work area 107.

The autonomous device 102 comprises the receiver 110 which can include sensors 114, 116, 118, 120, a processing component 122 for sampling and analyzing the transmitted signal 112, and/or other sensors, for example, navigational sensors 124. The receiver 110 analyzes signal data useful for directing movement and operation of the autonomous device 102, for example, determining a location of the autonomous device 102 in relation to the wire 106. In an embodiment, the receiver 110 can also analyze signal data associated with the beacon 108*a*, and other sensors and sensor systems associated with the disclosed system and method.

The navigational sensors 124 can be of various types. For instance, sensors operable to sense the relative motion of the autonomous device 102 might be used, such as odometers, accelerometers, gyroscopes, magnetometers, inertial sensors, inertial measurement unit (IMU), ultra-wideband (UWB), and global navigation satellite systems (GNSS).

Sensors operable to receive signals exterior the autonomous device 102 can be used. The navigational sensors 124 can include antennas for receiving signals from beacons 108*a*, 108*b*, 108*c*, satellites, and the like.

In another example, the output of such relative motion sensors can be integrated so as to determine a distance traveled by the autonomous device 102. In other exemplary embodiments, navigation data and/or distance measurements obtained from multiple sensors is utilized to provide a measured distance value. In an embodiment, data obtained from a fused navigation system is utilized to provide the measured distance value. The fused navigation system can include data provided by two or more navigation data sources The receiver 110 can include sensors 114, 116, 118, 120 for detecting, receiving, and sampling the transmitted signal 112, and processing component 122. In an embodiment, receiver 110, and any of sensors 114, 116, 118, 120 and processing component 122, may be integral to or otherwise housed within a body or shell of the autonomous device 102.

An example autonomous device 102 moves about the work area 107, cutting grass as it goes. In an embodiment, the autonomous device 102 can operate as a receive-only system that uses the signal transmitted by the transmitter 105 to determine the autonomous device's 102 location relative to a wire 106, and/or relative to the base station 104, or other fixed point. In some embodiments, the autonomous device 102 can include both receive and transmit capabilities.

The processing component 122 includes hardware, software, and/or firmware components configured to receive, sample, filter, convert, process and use data, for example, data transmitted by the beacon 108a, transmitter 105, data received by the sensors 114, 116, 118, 120, navigational sensors 124, and other sensors and inputs.

In an embodiment, the processing component 122 of the autonomous device 102 includes a microprocessor, filtering hardware and software, memory, and other associated hardware, software, and algorithms for directing operation of the autonomous device 102, and for analyzing and storing data useful for proximity detection, for example, data associated with the beacons 108a, 108b and/or 108c. The processing component 122 can perform functions associated with extracting received signal strength indicator (RSSI) values by processing an RF signal, storing data in memory, for example, RSSI values and distance measurements, and correlating RSSI values with distance measurements to obtain a proximity value. In an embodiment, the proximity value comprises an RSSI value and corresponding distance value.

In operation, the autonomous device 102 moves about the work area 107 as the receiver 110 samples the transmitted signal 112 at intervals. In accordance with the laws of electromagnetism, the magnetic field, e.g. the transmitted signal 112, outside the perimeter defined by the perimeter wire 106 exhibits a 180° phase shift relative to the induced magnetic field inside the perimeter defined by the perimeter wire 106.

In an embodiment, the detection of one or more signals that are 180 degrees out of phase with the transmitted signal 112 cause the autonomous device 102 to be directed to defined work area 107. The autonomous device 102 can be directed to move in a direction, and/or at an angle, that will bring it back within the defined work area 107, as indicated by arrow 134.

The autonomous device 102 can also include a wireless module including a wireless transceiver, for example, Wi-Fi, Bluetooth®, and/or Bluetooth Low Energy Technology (BLE), which provides wireless access to autonomous device 102. The autonomous device wireless module can also enable communication between the autonomous device 102 and the transmitter 105 and/or the beacon 108a which can include a compatible wireless module having a wireless transmitter or transceiver. The autonomous device 102 can communicate with a transmitter 105 and/or beacon 108a, 108b, 108c that is within range of the respective wireless modules. The wireless module associated with the autonomous device 102 can be included as part of the receiver 110.

Still referring to FIG. 1, in some circumstances it is desirable for the autonomous device 102 to go to, or to return to, a target location (e.g., the base station 104 or another chosen location). For example, the autonomous device 102 can move to a target location or return to the base station 104 on command, upon completion of a work operation, to perform a charging operation, upon detection of rain or other weather related event, for storage, or to move out of the way when other activities are occurring within or near the work area 107.

In these instances, the disclosed technology provides an effective and economical solution that enables the autonomous device 102 to move reliably and efficiently to a target location, for example, to execute a docking maneuver, without the need for additional sensors or systems such as a camera. or other vision-based systems. The disclosed technology provides an improved device work time since more time can be spent on work operations, such as mowing, since time required for other operations, such as moving to a target location is reduced.

The accuracy of traditional proximity detection using Bluetooth Low Energy (BLE) received signal strength indication (RSSI) is negatively affected by environmental conditions (soil composition, buildings, weather, etc.), thereby making BLE a poor solution to this problem. Due to external factors influencing radio waves, such as absorption, interference, or diffraction, RSSI tends to fluctuate. The expected inconsistencies of radio frequency propagation in general environments makes it challenging to infer proximity from observed values without considering uncertainties in the data generating process.

The disclosed technology solves this problem by mitigating the effects that the operating environment has on the accuracy of proximity detection and measurements. In aspects, the disclosed technology provides proximity detection based on BLE RSSI data in connection with distance data which allows the RSSI to be used as a reliable proximity indicator.

Figure 2:
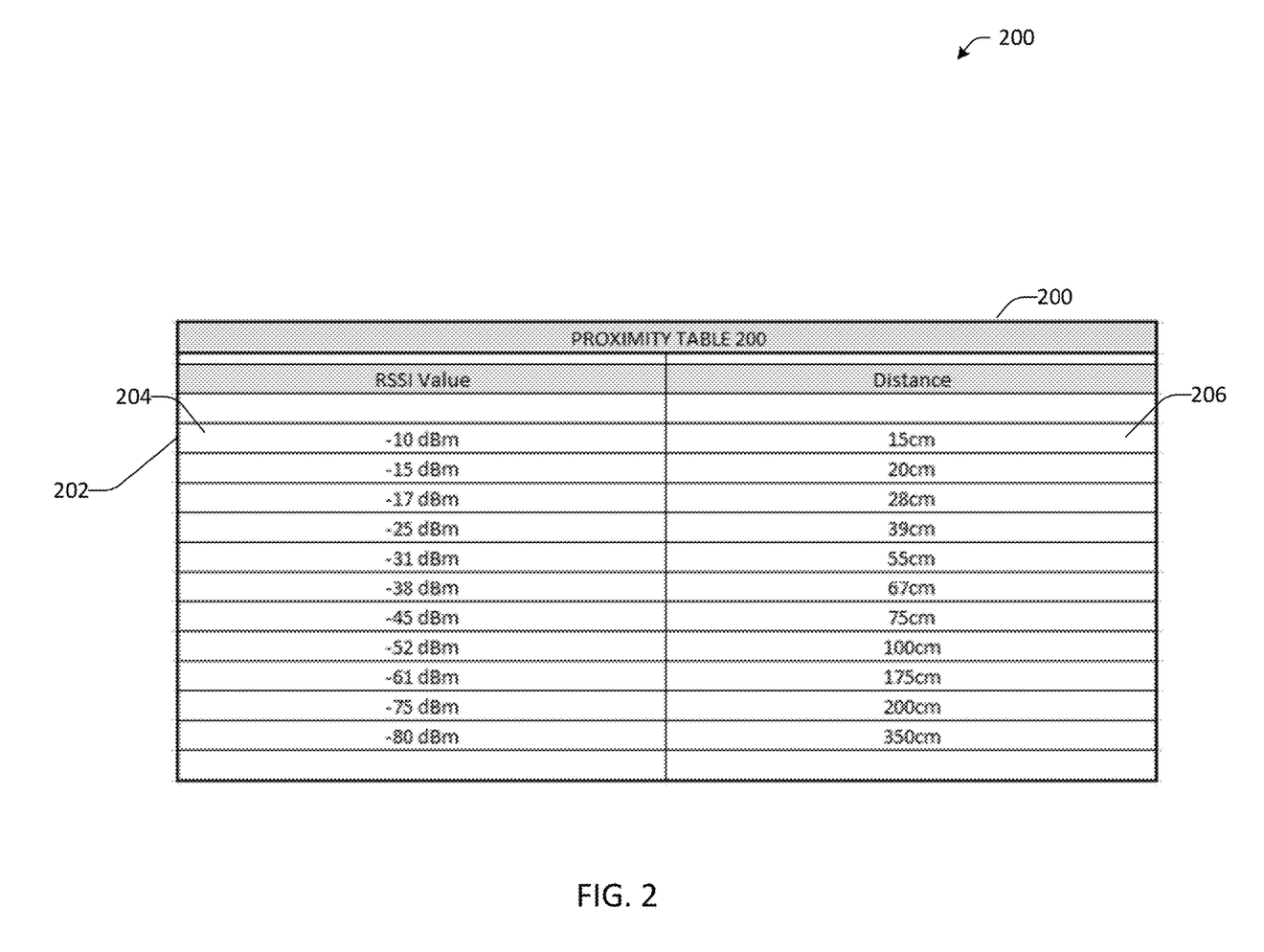
FIG. 2 is an exemplary data structure and proximity values in accordance with an aspect of the disclosure.

Referring to FIG. 2, an example data structure and proximity values 202 in a proximity table 200 is illustrated. In an embodiment, the autonomous device 102 can include one or more proximity tables 200 stored in memory and corresponding to one or more target locations. Each target location can include a beacon, e.g., beacon 108a, 108b, 108c. The proximity table 200 includes proximity values 202 comprising RSSI values 204 and corresponding distance values 206. In an embodiment, the proximity value 202 includes a calibrated distance value. While for purposes of illustration, the proximity values 202 are shown in proximity table 200, in embodiments the proximity values 202 can be managed utilizing most any other suitable data structure or format for organizing, processing, retrieving, and storing data.

The proximity table 200 can be populated with a range of default proximity values 202 which are stored in memory in advance of an autonomous device 102 operation. The proximity table 200 can be calibrated, that is, the corresponding RSSI values 204 and distance values 206 can be updated and refined utilizing the method 300.

Figure 3A:
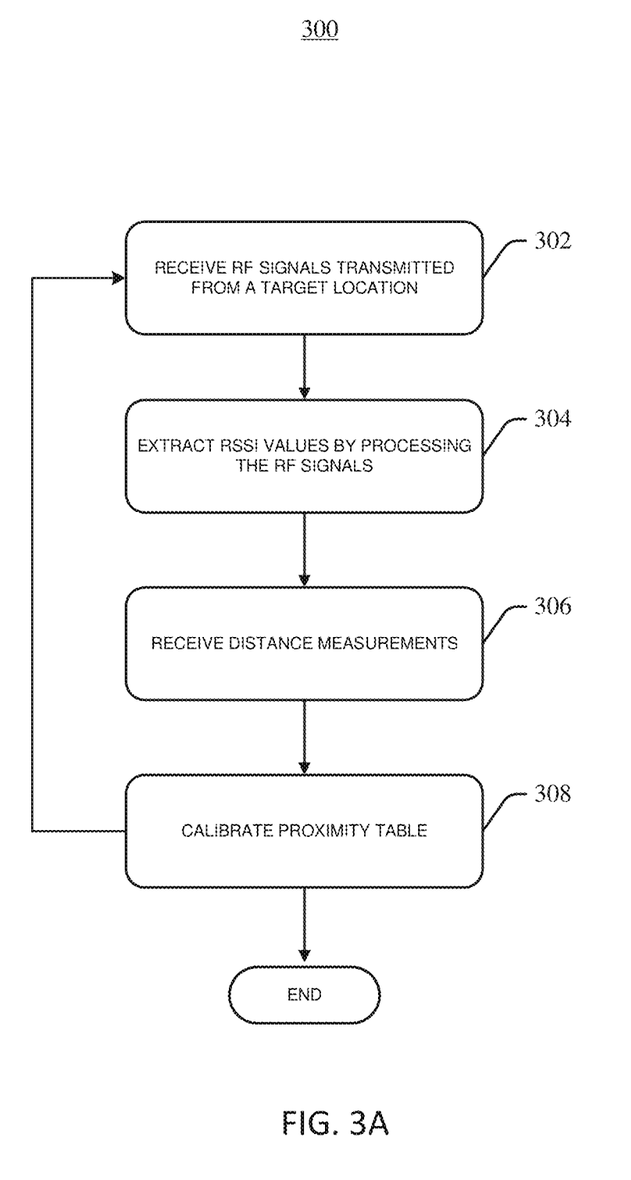
FIG. 3A is a flowchart of an example method for implementing proximity detection in accordance with an aspect of the disclosure.

With reference to FIG. 3A, there is depicted a flowchart of an example method 300 for calibrating a proximity table 200, in various disclosed embodiments. The autonomous device 102 can include one or more proximity tables 200 corresponding to one or more target locations. The method 300 can be performed and the appropriate proximity table 200 calibrated. The calibration method 300 can be performed by the processing component 122 of the autonomous device 102, which executes a program stored in memory. The calibration method 300 is carried out, for example, as the autonomous device 102 moves about the work area 107.

At 302, the method 300 begins as the autonomous device 102 receives data packets in the form of RF signals transmitted by a target location, for example, beacon 108a. The data packets can be received at an antenna associated with the autonomous device 102.

At 304, the processing component 122 of the autonomous device 102 extracts RSSI values by processing the RF signals.

At 306, the processing component 122 receives distances measurements provided by the navigational sensors 124 of the autonomous device 102. As detailed above in connection with the navigational sensors 124 of the autonomous device 102, sensors and sensing systems operable to sense the relative motion of the autonomous device can be utilized to provide the measured distance values. In an embodiment, data obtained from an odometer of the autonomous device 102 is utilized to provide the measured distance value.

In aspects, the autonomous device 102 can travel a known distance along a trajectory while extracting RSSI values from the RF signals, for example, RF signals transmitted by one or more of the beacons 108a 108b, and 108c. The extracted RSSI values and distance measurements are utilized to calibrate the proximity table 200. The disclosed technology can utilize a measurement of travel distance to dynamically adjust the autonomous device's 102 proximity estimates, e.g., proximity table 200, as a function of the measured RSSI of the signal transmitted by the beacon 108a as received at the autonomous device 102.

In an exemplary calibration procedure in accordance with the method 300, as the autonomous device 102 travels toward beacon 108a, in this case co-located with the base station 104, the autonomous device 102 extracts an RSSI value of −38 dBm. When the autonomous 102 has reached the beacon 108a, the odometer provides a distance measurement of 67 cm. The proximity table 200 is calibrated to include the proximity values 202, i.e. the corresponding RSSI value 204 of −38 dBm and distance value 206 of 67 cm.

In an embodiment, an indication that the autonomous device 102 has reached the target location, e.g., beacon 108a, can include data provided by an obstacle detection sensor or charging contacts of the autonomous device 102.

At 308, the proximity table 200 is calibrated. Based on the extracted RSSI values and the measured distance values, the processing component 122 calibrates the proximity table 200. The proximity table 200 includes calibrated proximity values 202, i.e. distances prescribed for respective RSSI values and/or RSSI values corresponding to distances, are managed, and stored in the memory of the autonomous device 102.

In an embodiment, the method 300 can be performed prior to an operation performed by the autonomous device 102. For example, the autonomous device 102 departs the base station to perform a mowing operation. Prior to performing the mowing operation, the autonomous device 102 travels away from the base station 104 while performing the method 300 for proximity table calibration, before proceeding with a work operation.

The calibration procedure of method 300 can be performed after the autonomous device 102 has completed a work operation, or when the autonomous device 102 returns to the base station 104, for example, to commence a charging operation. The calibration procedure of method 300 can be performed at random times, or can occur on a scheduled basis. Periodic calibration of the proximity table captures changing conditions in the work environment so that the autonomous device 102 has accurate proximity data, i.e. proximity values 204. In an embodiment, the proximity table 200 is calibrated at each work operation of the autonomous device 102 to prevent or minimize the impact of environmental conditions on the accuracy of the proximity detection.

The autonomous device 102 can execute the method 300 when a change in the autonomous device's operating environment has been detected. For example, a moisture sensor or rain gauge associated with the system detects a change, the autonomous device 102 will perform the proximity detection calibration method 300. In other embodiments, a grass height detector associated with the system can trigger the autonomous device 102 to perform the proximity table calibration routine of method 300.

In an embodiment, the calibration process is linear. That is, the extracted RSSI values and corresponding distance measurement values are translated directly in the proximity table 200. In other embodiments, the RSSI values and/or the distance measurement values can be modified incrementally from an existing value.

In an embodiment, an RSSI value in the table is modified by a function of the distance measurement value. Likewise, a distance measurement value can be modified by a function of the RSSI value. In determining the proximity value 202, an RSSI value 204 or a distance value 206 may be outside of an expected range, or a pre-defined threshold. When an RSSI value or a distance value is outside of a predetermined or expected range, the proximity value 202 can be estimated, or a default value is used.

When the difference in the calibrated proximity value 202 is greater than a threshold value, the calibrated value can be changed incrementally. For example, if an existing proximity table entry includes an RSSI value 204 associated with a distance 206 that is more than 5 db from the existing value, then the RSSI value can be increased by 2 db, and a then refined again when a subsequent measurement is made. In this way, large changes in the proximity values 202 are prevented, and the proximity table 200 is calibrated and updated incrementally.

Figure 3B:
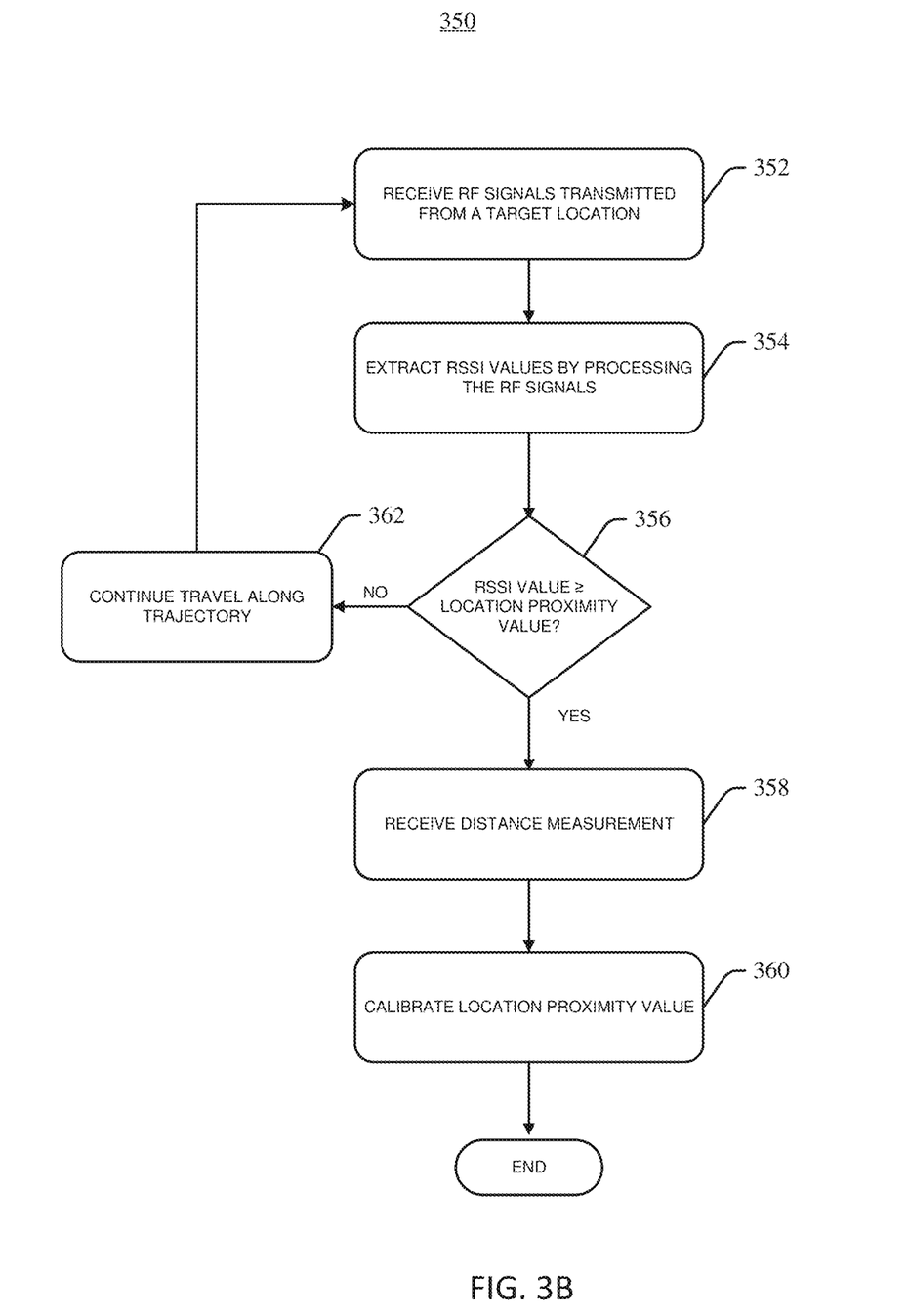
FIG. 3B is a flowchart of an example method for implementing proximity detection in accordance with an aspect of the disclosure.

With reference to FIG. 3B, there is depicted a flowchart of an example method 350 for calibrating a location proximity value 140, in various disclosed embodiments. The autonomous device 102 can include a predetermined location proximity value 140 stored in memory. The method 350 can be performed and the location proximity value 140 calibrated. The calibration method 350 can be performed by the processing component 122 of the autonomous device 102, which executes a program stored in memory. The calibration method 350 is carried out, for example, as the autonomous device 102 moves about the work area 107.

In an embodiment, the location proximity value 140 comprises an RSSI value which corresponds to a target distance to a target location.

Various operations carried out by the autonomous device 102, such as docking maneuvers, can be performed most efficiently when done at a prescribed distance (i.e. a target distance) from the base station 104, or other target location. In an example embodiment, the target distance is utilized to perform a docking maneuver upon return of the autonomous device 102 to the base station 104. For example, the autonomous device 102 can execute a 180 degree turn, and then enter the base station 104 such that a rear portion of the autonomous device 102 engages the base station 104 first. In this scenario, the target distance is the location within the work area 107 that is a prescribed or desired distance from the base station 104 for the autonomous device 102 to efficiently execute a 180 degree turn before entering the base station 104.

In an exemplary embodiment, it is determined that the target distance to the base station 104 is 100 cm. The location proximity value 140 is calculated as an RSSI value corresponding to a location that is 100 cm away from the base station 104. The calculated location proximity value 140 is stored in memory in the processing component 122 of the autonomous device 102.

As the autonomous device 102 moves towards or returns to the base station 104, it can detect an RSSI value corresponding to the location proximity value 140, the autonomous device 102 then executes a 180 degree turn at the target distance, and then drives backwards into the base station 104.

In an embodiment, a location proximity value 140 is stored in memory in the processing component 122 of the autonomous device 102 in advance of an autonomous device operation. The predetermined location proximity value 140 can be calculated based on measured or expected values, properties or configurations associated with any of the autonomous device 102, base station 104, work area 107, beacons 108a, 108b and 108c, and/or other properties associated with the disclosed technology.

At 352, the method 350 begins as the autonomous device 102 travels along a trajectory and receives data packets in the form of RF signals transmitted by a target location, for example, beacon 108a. The data packets can be received at an antenna associated with the autonomous device 102.

At 354, the processing component 122 of the autonomous device 102 extracts RSSI values associated with received data packets by processing the RF signals.

At 356, a determination is made whether the extracted RSSI value is equal to or greater than the location proximity value 140. If the answer to the test at decision block 356 is NO, and thus the RSSI value is less than the location proximity value 140, then the method proceeds to Step 362 and the autonomous device continues to travel along a trajectory toward the target location, and the method 356 continues.

If the answer to the test at decision block 356 is YES, and thus the RSSI value is determined to be either greater than or equal to the location proximity value 140, then the method proceeds to Step 358.

At 358, the processing component 122 receives a distance measurement provided by the navigational sensors 124 of the autonomous device 102. In this example, the distance measurement includes a distance from where the extracted RSSI value is determined to be equal to or greater than the location proximity value 140 to the base station 104, or other target location. The distance measurement can be provided by the navigational sensors 124 of the autonomous device 102 as described in detail above in connection with method 300.

At 360, the location proximity value 140 is calibrated. The processing component 122 calibrates the location proximity value 140 based on the extracted RSSI value and the measured distance value. The location proximity value 140 includes a calibrated RSSI value corresponding to a target distance to a target location, for example the base station 104. In embodiments, the location proximity value 140 is modified incrementally from the existing value.

In an exemplary calibration procedure 360 in accordance with the method 350, if the measured distance is greater than the prescribed distance, in this example 100 cm, then the selected location proximity value 140, in the form of an RSSI value, is increased from its present value and stored in memory. Thus, upon the autonomous device's 102 next approach to the base station 104, a greater RSSI detection value is utilized for comparison at step 356. Likewise, when the measured distance is less than the prescribed distance, then the location proximity value 140 is decreased from its present value and stored in memory. Upon the autonomous device's 102 next approach to the base station 104, a decreased RSSI detection value is utilized for comparison at step 356.

In an embodiment, the location proximity value 140 is modified by a function of the distance measurement value. In determining the location proximity value 140, a measured distance value may be outside of an expected range, or a pre-defined threshold. When a measured distance value is outside of a predetermined or expected range, the location proximity value 140 can be estimated, or a default value is used.

As described in detail above in connection with method 300, when a difference in the target distance and the measured distance is greater than a threshold value, the calibrated location proximity value 140 can be changed incrementally. Thus, large or abrupt changes in the location proximity value 140 can be prevented, and the location proximity value 140 is calibrated and updated gradually.

In other embodiments, the autonomous device 102 can move about the work area 107 in a search for the base station 104, for example, to perform a charging operation. The autonomous device 102 can determine a general location and proximity to the base station 104 based on the extracted RSSI values and the location proximity value 140.

The disclosed technology provides a learning behavior mechanism for an autonomous device that dynamically adjusts a proximity estimate as a function of RSSI. Within a few operational cycles the system can learn an RSSI value that accurately represents a desired distance (i.e., the target distance) of X cm between the autonomous device 102 and a target location such as the base station 104.

In an embodiment, the method 350 can be performed prior to an operation performed by the autonomous device 102. For example, the autonomous device 102 departs the base station to perform a mowing operation. Prior to performing the mowing operation, the autonomous device 102 travels away and then back towards the base station 104 while performing the method 350 for location proximity value 140 calibration, before proceeding with a work operation.

Similar to method 300, the calibration procedure of method 350 can be performed after the autonomous device 102 has completed a work operation, or when the autonomous device 102 returns to the base station 104, for example, to commence a charging operation. The calibration procedure of method 350 can be performed at random times, or can occur on a scheduled basis. Periodic calibration of the location proximity value 140 captures changing conditions in the work environment. In an embodiment, the location proximity value 140 is calibrated at each work operation of the autonomous device 102 to prevent or minimize the impact of environmental conditions.

Although the methods 300 and 350 have been described in exemplary embodiments, it should be appreciated that the disclosed technology provides accurate relative localization using a calibrated BLE RSSI value that is useful for many autonomous device operations.

Figure 4:
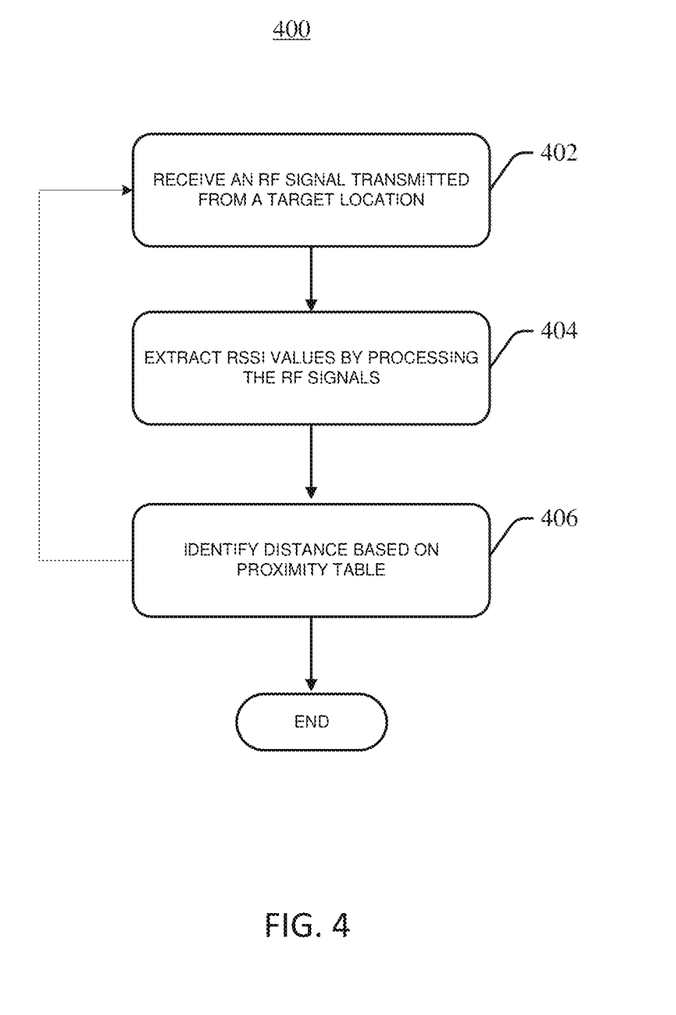
FIG. 4 is a flowchart of an example method for implementing proximity detection in accordance with an aspect of the disclosure.

With reference to FIG. 4, there is depicted a flowchart of an example method 400 for proximity detection, or for identifying a distance to a target location, in various disclosed embodiments. In an embodiment, the methods 300 and 400 can be executed simultaneously, or in connection with one another during the course of the same operation. The proximity detection method 400 is performed by the processing component 122 which executes a program stored in memory. The proximity detection method 400 can be carried out, for example, when the proximity table 200 has been calibrated, or when the proximity table has been populated with default proximity values 202. The proximity table 200 can be populated with a range of default proximity values 202 which are stored in memory in advance of an autonomous device 102 operation.

At 402, the method begins as the autonomous device 102 receives data packets in the form of RF signals transmitted by a target location, for example, beacon 108a. The data packets can be received at an antenna associated with the autonomous device 102.

At 404, the processing component 122 of the autonomous device 102 extracts RSSI values by processing the RF signals.

At 406, the processing component 122 identifies a distance 206 to the target location utilizing the extracted RSSI value 204 and the proximity table 200. When the calibrated proximity table 200 is stored in the memory, the processing component 122 identifies a distance to the target location 108a, e.g. the base station 104, based on the extracted or measured RSSI value and the calibrated proximity table 200. For example, when the measured RSSI value is −31 dBm, the processing component 122 identifies "55 cm", which is a distance associated with the measured RSSI, from the calibrated proximity table 200 and identifies the extracted "55 cm" as the distance to the target location 108a.

In many circumstances, accurate information on the proximity, or the distance to, a target location is valuable to the autonomous device 102. For example, accurate proximity information makes it possible to execute a docking procedure at an optimal or specific distance from the base station 104. This can help to reduce wear and tear on the turf particularly near the base station 104 which can be prone to abuse. In an embodiment, the docking maneuvers are varied at a pre-determined distance or a random distance to reduce wear, and lessen damage to grass in the area surrounding the base station 104, or other target location.

In an embodiment, the autonomous device 102 approaches the base station 104 utilizing a back docking maneuver. The autonomous device 102 approaches the base station 104, performs a 180 degree turn, and then enters the base station 104 such that a rear portion of the autonomous device 102 engages the base station 104 first (i.e. the autonomous device 102 "backs into" the charge station).

In an example docking maneuver, the 180 degree turn is executed at 100 cm from the base station 104. The autonomous device 102 can locate the 100 cm distance value in the proximity table 200, and when it has detected an RSSI value that corresponds to 100 cm, the autonomous device 102 executes a 180 degree turn, and then drives backwards into the base station 104. In other embodiments, the method 400 can be utilized to accurately locate a target location, or other stationary point.

Various operations carried out by the autonomous device 102, such as docking maneuvers, can be performed most efficiently when done at a prescribed distance from the base station 104, or other point. In embodiments, purposefully varying the distance from the base station 104 in which the docking maneuvers, or other operations, are performed can help minimize wear and tear and damage to the turf In an embodiment, the methods 300 and 400 can be executed simultaneously, or in connection with one another during the course of the same operation. The autonomous device 102 can make use of the calibrated proximity values 202 while gathering RSSI values and distance measurement that can be used to refine and update the proximity table 200.

Figure 5:
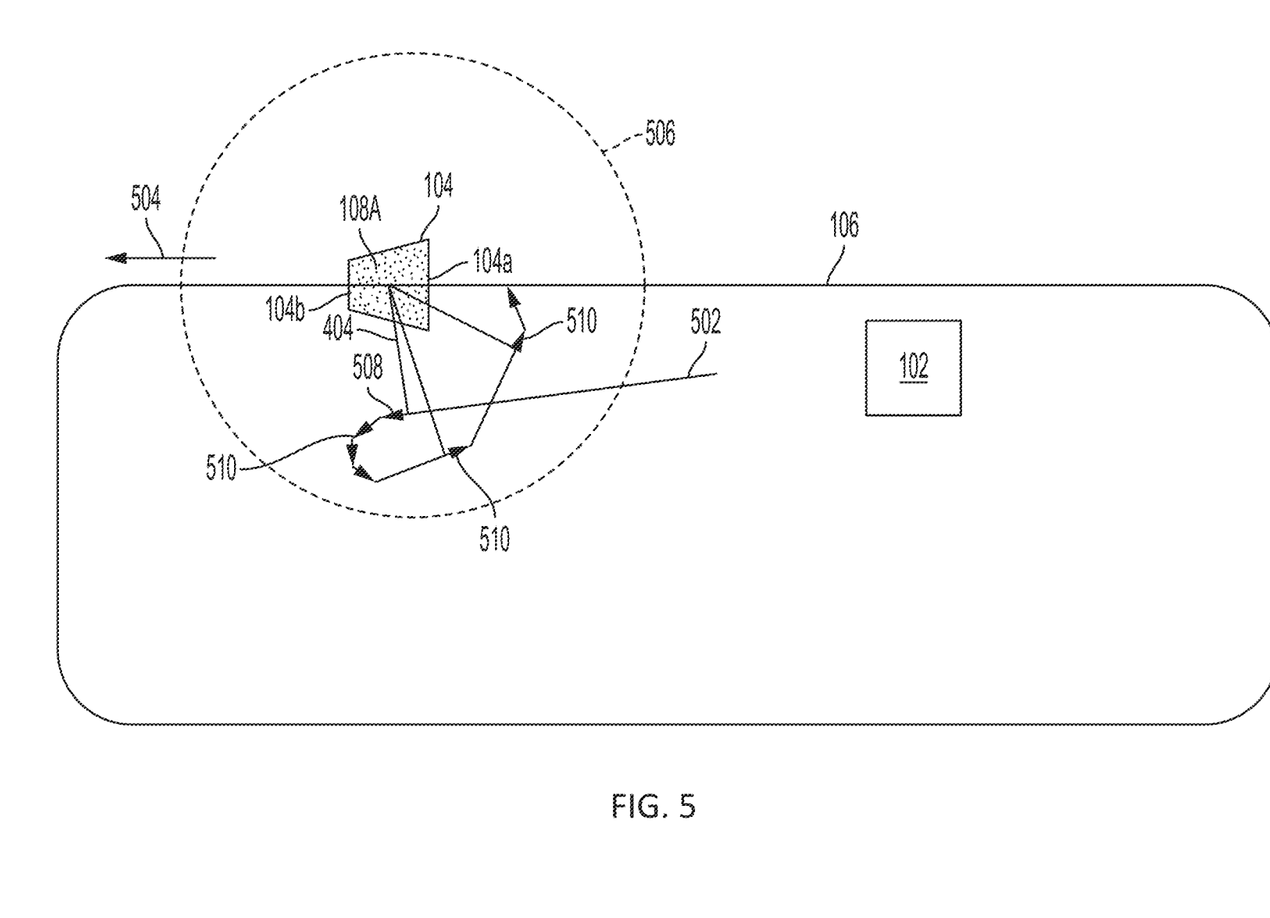
FIG. 5 is an illustration of an example system for proximity detection in accordance with an aspect of the disclosure.

With reference to FIG. 5, a trajectory 502 of the autonomous device 102 as it approaches the base station 104 can be controlled utilizing, for example, an RSSI gradient associated with the BLE signal transmitted by the beacon 108a and received by the autonomous device 102. In this example, the beacon 108a is co-located with the base station 104. In other embodiments, the beacon 108a, 108b, 108c can be positioned at or near the base station 104, and/or at a target location. The base station 104 is electrically connected to the perimeter wire 106, and the autonomous device 102 can locate and then travel along the wire 106 to arrive at the base station 104. The autonomous device 102 approaches the base station 104 from an entry point to enter the base station 104. A BLE signal gradient-based trajectory is utilized to orient the autonomous device into an entry-path of the docking station.

Two sides 104a and 104b of the base station 104 are similarly positioned with regard to the wire 106. The autonomous device 102 enters the base station 104 from the entry point at side 104a. When the autonomous device 102 approaches the base station 104 from side 104b, for example by following the wire 106, the autonomous device is unable to enter the base station 104.

In that instance, the autonomous device 102 can be made to follow the wire 106 in the direction opposite to the base station 104, as indicated by arrow 504. The autonomous device 102 moves away from and then back towards the base station 104 as it follows the wire 106, in order to approach the base station 104 from the entry point at side 104a. Although effective, this tactic is time consuming and inefficient. The disclosed technology provides a system and method for enabling the autonomous device 102 to efficiently locate and approach the base station 104 from an appropriate direction near the entry point at side 104a.

In an embodiment, an RSSI gradient, i.e. a measure of the change in the RSSI per distance, is utilized to orient the autonomous device 102 to the entry of the base station 104. The RSSI field 506 of the signal transmitted by the beacon 108a is theoretically radial to the base station 104. Thus, the RSSI field 406 as seen by the autonomous device 102 becomes weaker as the autonomous device 102 moves away from the beacon 108a.

The strength of the RSSI field 506 also declines isotropically, that is, having the same or similar RSSI values when measured along axes in all directions. This isotropic effect is used to determine whether the autonomous device 102 is moving towards or away from the base station 104. In the event that the RSSI field 506 is not isotropic, due for example to resonance and/or noise, the RSSI gradient can be compensated or filtered utilizing known methods to account for this.

Still referring to FIG. 5, an example autonomous device trajectory 502 is demonstrated. As the autonomous device 102 moves closer to the base station 104, the beacon's 108a field strength increases. Once the autonomous device 102 begins to move past the base station 104 at point 508, the RSSI field 506 begins to decrease. When the autonomous device 102 detects that an RSSI gradient has decreased, based on the strength of the RSSI field 506 and the distance traveled, the autonomous device 102 executes a left turn or veers left, as illustrated at the points 510 of trajectory 502.

The autonomous device 102 continues to move forward along trajectory 502, executing left turns 510 as it senses a decreasing RSSI gradient. When the RSSI field 506, and the corresponding RSSI gradient, has increased, or stayed the same, the autonomous device 102 continues to move forward along trajectory 502 and does not execute a left turn 510. The combination of forward movement and left turns 510 causes the autonomous device 102 to eventually orient itself near the base station entry point side 104a perpendicular to the RSSI field 506, and the wire 106. When the autonomous device 102 has arrived at the wire 106 near the entry point side 104a of the base station 104, the autonomous device 102 is then in position to begin a docking maneuver to enter the base station 104, or follow the wire 106 to enter the base station 104.

Figure 6:
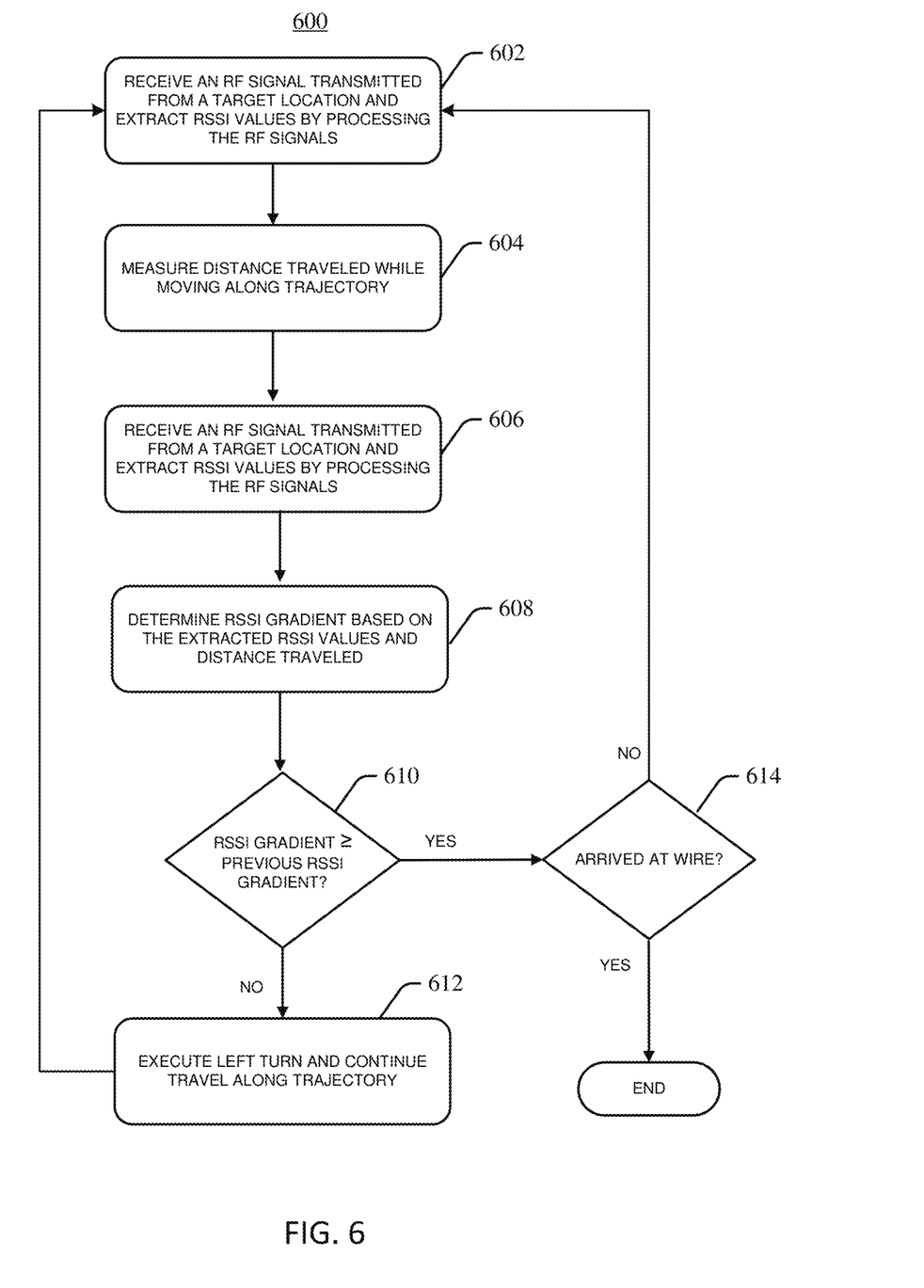
FIG. 6 is a flowchart of an example method for implementing proximity detection in accordance with an aspect of the disclosure.

With reference to FIG. 6, there is depicted a flowchart of an example method 600 for autonomous device navigation 600.

At 602, method 600 begins by receiving an RF signal at an antenna of the autonomous device 102 from a target location (e.g., beacon 108a, 108b or 108c), and extracting RSSI values by processing the RF signal. In an exemplary embodiment, Step 602 can be accomplished, for example, as described in detail supra in connection with steps 302 and 304 of method 300.

At 604, the autonomous device 102 receives data indicating a distance traveled as it moves along the trajectory 502. In an exemplary embodiment, Step 604 can be accomplished, for example, as described in detail supra in connection with step 306 of method 300.

At 606, the autonomous device 102 receives an RF signal from a target location (e.g., beacon 108a, 108b or 108c), and extracts RSSI values by processing the RF signal.

At 608, an RSSI gradient is determined based on the RSSI values extracted at Steps 602 and 606, and the measured distance traveled determined at Step 604.

From 608 the method 600 proceed to decision block 610 where a determination is made whether the RSSI gradient is greater than or equal to a previous RSSI gradient. In aspects, the RSSI gradient can be compared against a default RSSI gradient value. For example, at a first iteration of method 600, there may not be a previous gradient value to compare to, and the RSSI gradient can be compared against a default gradient value. If the answer to the test at decision block 610 is NO, and thus the RSSI gradient is determined to have decreased, then the method proceeds to Step 612.

At 612, the autonomous device 102 executes a left turn 408, or veers left and continues to move forward along the trajectory 502.

If the answer to the test at decision block 610 is YES, and thus the RSSI gradient is determined to have either stayed the same or increased over a previous RSSI gradient, then the method proceeds to Step 614.

At 614, a determination is made as to whether the autonomous device 102 has reached the wire 106. If the answer to the test at decision block 614 is NO, then the method proceeds to Step 602 and continues.

If the answer to the test at decision block 614 is YES, then the method 600 ends, and the autonomous device 102 can begin a docking maneuver, or follow the wire 106 to enter the base station 104 at the entry point 104a.

In an embodiment, the methods 300, 350, 400 and/or 600 can be executed simultaneously, or in connection with one another, for example, during the course of the same operation. For example, the autonomous device 102 can make use of the calibrated proximity values 202 (method 400) while gathering RSSI values and distance measurement that can be used to refine and update the proximity table 200 (method 300). The autonomous device 102 can utilize of the calibrated proximity values 202 (method 400) and/or the location proximity value 140 (method 350) together with the navigational information provided by method 600 to determine a direction to the target location, and/or to determine a proximity, or a target distance, to a target location.

A method for proximity determination can include receiving an RF signal transmitted from a target location, the receiving performed by an antenna of an autonomous moving device, extracting received signal strength indicator (RSSI) values by processing the received RF signal, wherein the autonomous device can include a memory in which extracted RSSI values are stored, receiving distance measurements provided by a sensor associated with the autonomous moving device and storing the distance measurements in the memory of the autonomous device, and correlating the extracted RSSI values with the distance measurements to obtain a proximity value.

A method for proximity determination can include a proximity value comprising a correlation of an RSSI value and a distance value.

A method for proximity determination can include correlating the extracted RSSI values with the distance measurements, for example, by receiving distance measurements while the autonomous device is in motion, comparing the distance measurements to the extracted values until an indication that autonomous device has reached the target location, and modifying the proximity values.

A method for proximity determination can include determining a proximity of the autonomous moving device in relation to the target location based the proximity value, wherein the proximity value comprises an RSSI value and a corresponding distance value.

A method for proximity determination can include an indication that the autonomous device has reached the target location, for example, at least one of data from an obstacle detection sensor and data from a charging contact of the autonomous device.

A method for proximity determination can include processing the received RF signal, correlating the extracted RSSI values with the distance measurements, and determining the proximity of the autonomous moving device are performed by a processing component of the autonomous device.

A method for proximity determination can include distance measurements based on navigational sensor data comprising a distance traveled by the autonomous device, wherein the navigational sensor data comprises odometry data.

A method for proximity determination can include an RF signal comprising a Bluetooth Low Energy (BLE) beacon transmission.

A method for proximity determination can include an autonomous device comprising an autonomous mower.

A method for proximity determination can include moving the autonomous device to the target location based on the extracted RSSI values, and performing a docking maneuver at a predetermined distance from the target location based on the proximity values.

A method for proximity determination can include correlating the RSSI with a measured distance to obtain the proximity value comprises a direct correlation.

A method for proximity determination can include correlating the RSSI with a measured distance to obtain the proximity value comprises an algorithmic correlation.

A method for proximity determination can include correlating the RSSI with a measured distance to obtain the proximity value comprises a weighted correlation.

A method for proximity determination can include a proximity value that is updated at a pre-determined time interval, wherein the predetermined time interval is one of 6 hours, 12 hours, 24 hours, and 36 hours.

A method for proximity determination can include a proximity value that is updated prior to performance of a work operation by the autonomous device.

A method for proximity determination can include a proximity value that is updated at a conclusion of a performance of an operation of the autonomous device, at a random time interval, in response to a user command, and/or at the detection of an environmental change.

A method for proximity determination can include a proximity value including an estimated distance to the target location.

A method for proximity determination can include a proximity value that is updated in response to a change in an operating environment of the autonomous device, wherein the change comprises at least one of data provided a moisture sensor, rain gage or obstacle detection sensor.

A method for autonomous device navigation can include receiving an RF signal transmitted from a target location, the receiving performed by an antenna of the autonomous device, extracting received signal strength indicator (RSSI) values by processing the received RF signal, and moving the autonomous device to the target location based on the extracted RSSI values, wherein the autonomous device comprises a memory in which extracted RSSI values are stored, and wherein the moving of the autonomous device to dock to the base station based on the extracted RSSI values includes evaluating RSSI values as the autonomous device is in motion, and determining an RSSI gradient based on successive RSSI values and a distance traveled, moving the autonomous device forward when a successive RSSI gradient is greater than or equal to a previous RSSI gradient, and executing a left turn when a successive RSSI gradient is less than a previous RSSI gradient.

A method for autonomous device navigation or proximity determination can include evaluating RSSI values as the autonomous device is in motion, and moving the autonomous device forward when a successive RSSI value is greater than or equal to a previous RSSI value, performing a docking maneuver when the RSSI value is greater than or equal to a predetermined turning point threshold value, correlating a turning point threshold value with a distance to the base station based on odometry sensor data indicating a distance traveled by the autonomous device, and adjusting, via the processor, the predetermined turning point threshold value to correspond to a distance X.

A method for autonomous device navigation can include a predetermined turning point threshold value that is varied at each operation.

An apparatus for proximity determination can include a memory device that stores a set of instructions, and a processor that executes the set of instructions for receiving an RF signal transmitted from a target location, the receiving performed by an antenna of an autonomous moving device, extracting received signal strength indicator (RSSI) values by processing the received RF signal, wherein the autonomous device comprises a memory device in which extracted RSSI values are stored, receiving distance measurements provided by a sensor associated with the autonomous moving device and storing the distance measurements in the memory of the autonomous device; and determining a proximity value by correlating the extracted RSSI values with the distance measurements.

An apparatus for proximity determination can include proximity values stored in the memory device in a data structure or table.

An apparatus for proximity determination can include proximity values calibrated as the autonomous device moves towards the target location, and the proximity values are calibrated when the autonomous device has reached the target location.

A proximity determination apparatus that receives a radio frequency (RF) signal transmitted from a target location and extracts received signal strength indicator (RSSI) values by processing the received RF signal can include a memory device that stores a set of instructions, and a processor that executes the set of instructions for receiving distance measurements provided by a sensor associated with an autonomous moving device, storing the distance measurements in the memory of the autonomous device, correlating the extracted RSSI values with the distance measurements to obtain a proximity value, and storing the proximity value in the memory of the autonomous device.

A method for calibrating a proximity detection data structure can include receiving an RF signal transmitted from a target location, the receiving performed by an antenna of an autonomous moving device, extracting received signal strength indicator (RSSI) values by processing the received RF signal, wherein the autonomous device comprises a memory in which extracted RSSI values are stored, receiving distance measurements provided by a sensor associated with the autonomous moving device and storing the distance measurements in the memory of the autonomous device, correlating the extracted RSSI values with the distance measurements to obtain a proximity value, and storing the proximity value in the proximity detection data structure in the memory of the autonomous device.

A method for calibrating a proximity detection data structure can include providing a data structure comprising default proximity values, and updating the default proximity values based on a correlation of the extracted RSSI values and the distance measurements.

A method for proximity determination can include receiving an RF signal transmitted from a target location, the receiving performed by an antenna of an autonomous device, extracting a received signal strength indicator (RSSI) value by processing the received RF signal, evaluating the RSSI value based on a location proximity value stored in a memory of the autonomous device, and moving the autonomous device towards a target location when the RSSI value is greater than or equal to the location proximity value, receiving a distance measurement when the autonomous device has reached the target location, and calibrating the location proximity value based on the distance measurement.

A method for proximity determination can include a location proximity value comprising a calculated RSSI value which corresponds to a prescribed distance.

A method for proximity determination can include a distance measurement comprising a distance traveled by the autonomous device from a point where the RSSI value was determined to be greater than or equal to the location proximity value and the target location.

A method for proximity determination can include calibrating the location proximity value based on the distance measurement comprises increasing or decreasing the location proximity value stored in memory.

A method for proximity determination can include an indication that the autonomous device has reached the target location comprises at least one of data from an obstacle detection sensor and data from a charging contact of the autonomous device.

A method for proximity determination can include processing the received RF signal, evaluating the RSSI value, and calibrating the location proximity are performed by a processing component of the autonomous device.

A method for proximity determination can include a distance measurement based on navigational sensor data comprising a distance traveled by the autonomous device, wherein the navigational sensor data comprises odometry data.

A method for proximity determination can include an RF signal comprising a Bluetooth Low Energy (BLE) beacon transmission.

A method for proximity determination can include an autonomous device comprising an autonomous mower.

A method for proximity determination can include moving the autonomous device towards the target location, and performing a docking maneuver when the RSSI value is greater than or equal to the location proximity value.

A method for proximity determination can include calibrating the location proximity value comprises a direct correlation, an algorithmic correlation, and or a weighted correlation.

A method for proximity determination can include a location proximity value calibrated prior to performance of a work operation by the autonomous device, at a conclusion of a performance of an operation of the autonomous device, at a random time interval, in response to a user command, and/or at the detection of an environmental change.

A method for proximity determination can include a location proximity value calibrated in response to a change in an operating environment of the autonomous device, wherein the change comprises at least one of data provided a moisture sensor, rain gage or obstacle detection sensor.

While, for purposes of simplicity of explanation, the methodologies illustrated in the figures are shown and described as a series of acts, it is to be understood and appreciated that the subject disclosure is not limited by the order of acts, as some acts may, in accordance with the disclosure, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosure While embodiments of the disclosed systems and methods have been described, it should be understood that the disclosed systems and methods are not so limited, and modifications may be made without departing from the disclosed systems and methods. The scope of the systems and method are defined by the appended claims, and all devices, processes, and methods that come within the meaning of the claims, either literally or by equivalence, are intended to be embraced therein.

The invention claimed is:

1. A method for proximity determination, comprising:
   receiving an RF signal transmitted from a target location, the receiving performed by an antenna of an autonomous moving device;
   extracting received signal strength indicator (RSSI) values by processing the received RF signal, wherein the autonomous moving device comprises a memory in which extracted RSSI values are stored;
   receiving distance measurements provided by a sensor associated with the autonomous moving device and storing the distance measurements in the memory of the autonomous moving device;
   correlating the extracted RSSI values with the distance measurements to obtain a proximity value; and
   moving the autonomous moving device to the target location based at least in part on the extracted RSSI values.

2. The method for proximity determination of claim 1, wherein the proximity value comprises a correlation of an RSSI value of the extracted RSSI values and a distance value of the distance measurements.

3. The method for proximity determination of claim 1, wherein correlating the extracted RSSI values with the distance measurements comprises:
   receiving distance measurements while the autonomous moving device is in motion;
   comparing the distance measurements to the extracted values until an indication that the autonomous moving device has reached the target location; and
   modifying the proximity value.

4. The method for proximity determination of claim 3, comprising:
   determining a proximity of the autonomous moving device in relation to the target location based on the proximity value, wherein the proximity value comprises an RSSI value of the extracted RSSI values and a corresponding distance value of the distance measurements.

5. The method for proximity determination of claim 3, wherein the indication that the autonomous moving device has reached the target location comprises at least one of: data from an obstacle detection sensor or data from a charging contact of the autonomous moving device.

6. The method for proximity determination of claim 1, wherein processing the received RF signal, correlating the extracted RSSI values with the distance measurements, and determining the proximity of the autonomous moving device are performed by a processing component of the autonomous device.

7. The method for proximity determination of claim 1, wherein the distance measurements are based on navigational sensor data comprising a distance traveled by the autonomous moving device, wherein the navigational sensor data comprises odometry data.

8. The method for proximity determination of claim 1, wherein the RF signal comprises a Bluetooth Low Energy (BLE) beacon transmission.

9. The method for proximity determination of claim 1, comprising performing a docking maneuver at a predetermined distance from the target location based on the proximity value.

10. The method for proximity determination of claim 1, wherein correlating the RSSI with the distance measurements to obtain the proximity value comprises a direct correlation.

11. The method for proximity determination of claim 1, wherein correlating the RSSI with the distance measurements to obtain the proximity value comprises an algorithmic correlation.

12. The method for proximity determination of claim 1, wherein correlating the RSSI with the distance measurements to obtain the proximity value comprises a weighted correlation.

13. The method for proximity determination of claim 1, wherein the proximity value is updated at a conclusion of a performance of an operation of the autonomous moving device, at a random time interval, in response to a user command, or at the detection of an environmental change, or a suitable combination of the foregoing.

14. The method for proximity determination of claim 1, wherein the proximity value is updated in response to a change in an operating environment of the autonomous moving device, wherein the change comprises at least one of: data provided by a moisture sensor, by a rain gauge or by an obstacle detection sensor.

15. A method for proximity determination, comprising:
receiving an RF signal transmitted from a target location, the receiving performed by an antenna of an autonomous device;
extracting a received signal strength indicator (RSSI) value by processing the received RF signal;
correlating the extracted RSSI value with a corresponding distance to the target location;
evaluating the corresponding distance of the extracted RSSI value based on a location proximity value stored in a memory of the autonomous device;
moving the autonomous device towards the target location when the corresponding distance correlated to the extracted RSSI value is greater than or equal to the location proximity value;
receiving a distance measurement when the autonomous device has reached the target location; and
calibrating the location proximity value based on the distance measurement.

16. The method for proximity determination of claim 15, wherein the location proximity value comprises a calculated RSSI value which corresponds to a prescribed distance.

17. The method for proximity determination of claim 15, wherein the distance measurement comprises a distance traveled by the autonomous device from a point where the corresponding distance was determined to be greater than or equal to the location proximity value and the target location.

18. The method for proximity determination of claim 15, wherein calibrating the location proximity value based on the distance measurement comprises increasing or decreasing the location proximity value stored in memory.

19. The method for proximity determination of claim 15, wherein an indication that the autonomous device has reached the target location comprises at least one of data from an obstacle detection sensor and data from a charging contact of the autonomous device.

20. The method for proximity determination of claim 15, wherein processing the received RF signal, evaluating the RSSI value, and calibrating the location proximity value are performed by a processing component of the autonomous device.

21. The method for proximity determination of claim 15, wherein the distance measurement is based on navigational sensor data comprising a distance traveled by the autonomous device, wherein the navigational sensor data comprises odometry data.

22. The method for proximity determination of claim 15, wherein the RF signal comprises a Bluetooth Low Energy (BLE) beacon transmission.

23. The method for proximity determination of claim 15, comprising moving the autonomous device towards the target location, and performing a docking maneuver when the corresponding distance is greater than or equal to the location proximity value.

24. The method for proximity determination of claim 15, wherein calibrating the location proximity value comprises a direct correlation, an algorithmic correlation, and or a weighted correlation.

25. The method for proximity determination of claim 15, wherein the location proximity value is calibrated prior to performance of a work operation by the autonomous device, at a conclusion of a performance of an operation of the autonomous device, at a random time interval, in response to a user command, and/or at the detection of an environmental change.

* * * * *